US009145476B2

(12) United States Patent
Fuss et al.

(10) Patent No.: US 9,145,476 B2
(45) Date of Patent: Sep. 29, 2015

(54) PLASTIC CONTAINERS WITH GAS BARRIER COATING AND OPTIONALLY HYDROPHILIC INSIDE COATING

(75) Inventors: Robert Fuss, Liederbach (DE); Norman James Gottlieb, Ontario (CA)

(73) Assignee: KURARAY EUROPE GMBH, Ontario (CA)

( * ) Notice: Subject to any disclaimer, the term of this patent is extended or adjusted under 35 U.S.C. 154(b) by 461 days.

(21) Appl. No.: 13/487,588

(22) Filed: Jun. 4, 2012

(65) Prior Publication Data

US 2012/0306126 A1    Dec. 6, 2012

(30) Foreign Application Priority Data

Jun. 6, 2011    (EP) .................................... 11168859

(51) Int. Cl.
*B29C 45/16*    (2006.01)
*C08J 7/04*    (2006.01)
*B65D 23/08*    (2006.01)

(52) U.S. Cl.
CPC ............. *C08J 7/047* (2013.01); *B65D 23/0821* (2013.01); *C08J 2327/12* (2013.01); *C08J 2429/04* (2013.01)

(58) Field of Classification Search
None
See application file for complete search history.

(56) References Cited

U.S. PATENT DOCUMENTS

| 4,363,840 | A | * | 12/1982 | Roullet et al. ................ 428/36.6 |
| 4,617,468 | A | * | 10/1986 | Shiraishi et al. ............ 250/484.4 |
| 5,900,321 | A |   | 5/1999  | Carstens et al. |
| 2010/0261016 | A1 | * | 10/2010 | Radermacher et al. ....... 428/409 |

FOREIGN PATENT DOCUMENTS

| DE | 102 07 592 A1 | 9/2003 |
| GB | 879595 A | 10/1961 |
| GB | 2 337 470 A | 11/1999 |
| WO | WO 03/037969 A1 | 5/2003 |
| WO | WO 2004/089624 A2 | 10/2004 |

* cited by examiner

*Primary Examiner* — Monica Huson
(74) *Attorney, Agent, or Firm* — Millen, White, Zelano, Branigan, P.C.

(57) ABSTRACT

The invention is directed to a process for producing a plastic container with a barrier coating comprising a) applying at least one coating layer of a first polyvinyl acetal on at least a part of the plastic container; b) applying at least one coating layer of polyvinyl alcohol on the first polyvinyl acetal layer; c) applying at least one top coating layer of a second polyvinyl acetal on the polyvinyl alcohol layer. The surface of the plastic container may be pre-treated before coating. In addition to the barrier coating, the surface energy of at least a part of the inside surface of the plastic container may be increased by applying at least one inner hydrophilic coating layer.

20 Claims, 6 Drawing Sheets

PLASTIC CONTAINERS WITH GAS BARRIER COATING AND OPTIONALLY HYDROPHILIC INSIDE COATING

FIELD OF THE INVENTION

This invention relates to plastic containers having a scratch and moisture resistant barrier coating against oxygen or carbon dioxide and optionally a hydrophilic inner coating to facilitate emptying. Furthermore, the invention relates to a process for manufacturing of such containers.

BACKGROUND OF THE INVENTION

Plastic containers for food and beverages from polyethyleneterephthalate (PET), polypropylene (PP) or polyethylene (PE) are long known and are mostly produced in stretch blow molding processes.

It is also known to apply a barrier coating on such containers in order to reduce the permeation of gases, especially oxygen or carbon dioxide into or out of the container, thereby improving the shelf life of the packed goods.

For example, WO 03/037969 A1, GB 879595, DE 10153210 and DE 10207592 A1 describe the use of polyvinyl alcohol as gas barrier on PET bottles with an additional top coat comprising polyvinyl butyral to improve the water resistance of the barrier coating. Such multilayer coatings show a good barrier performance against oxygen and carbon dioxide, scratch resistance and are recyclable after mechanically destroying the top layer due the to the water solubility of the barrier coating.

Most plastic bottles for example used for soft drinks are produced by injection stretch blow molding from so called preforms. In such blowing processes, the preform is expanded to more than 10 times of its original volume resulting in a significant thinning of any coating layered on the surface of the preform. In order to prevent the degradation or cracks of the barrier coating during the stretch blow process, the prior art suggests several film building polymers for the top coating.

In this respect, GB 2337470 A1 discloses a method for coating a PET preform for bottles with a barrier coating based on PVA and protection of the barrier coated preform by applying a second polymeric material. As second polymeric material, polyester like PET and polycarbonates are suggested. This publication describes furthermore chemical or physical pre-treatments of the surface of the substrate prior to application of the barrier coating.

A similar technique is disclosed by WO 2004/089624, where containers for food or manufactured goods from PET or polyolefins are first coated with a blend of at least two polymers including PVA, polyamines, polyvinylimines, polyacrylic acids etc. and subsequently with a protective coating of polyurethanes, PVC or polyacrylates. Optionally and prior to the barrier coating, the substrate may be pre-treated by plasma, flames, chlorine, fluorine or chemical etching. Top coating polyvinyl alcohol as quite polar polymer with the polymers as proposed by this publication will result in mechanically and chemically unstable layers.

Many of the described plastic containers are used for end consumer products like food (ketchup, mayonnaise, jam) or personal care (shampoo, body lotion). There is a constant complaint of the customers of such goods that the plastic (bottles) can not be emptied completely and a part of the content of the container/bottles is wasted. Furthermore, customers and manufacturers would like to prolong the shelf-life of the packed goods without changing the thickness or the composition of the plastic material of the container.

Accordingly there is a need to improve the shelf-life of the packed goods and in addition the emptying behavior of the container at the same time.

OBJECT OF THE INVENTION

The present invention relates to a process for producing a plastic container with a barrier coating comprising the steps a) applying at least one coating layer of a first polyvinyl acetal on at least a part of the plastic container; b) applying at least one coating layer of polyvinyl alcohol on the first polyvinyl acetal layer; c) applying at least one top coating layer of a second polyvinyl acetal on the polyvinyl alcohol layer.

BRIEF DESCRIPTION OF THE DRAWINGS

Further features and advantages of the invention are to be explained with the following description of the Figures of exemplary embodiments by way of the Figures, in which:

FIGS. 6a-6d illustrate a stretch blow process in accordance with the invention; is shown by way of example in FIG. 6. In step a, the preform is first heated and then transferred into the mold (b). After stretching by force s and pre-blowing (step c), the bottle is finally blown in step d. FIG. 7 shows a coated preform according to the invention (a) which can be stretched without damaging the coating (b). The stretched preform of FIG. 7 can be converted into a stretched pre-blown coated preform as shown in FIG. 8a, which is finally inflated (blown) to a coated bottle (FIG. 8b);

FIG. 7b illustrates a stretched form of the coated preform of FIG. 7a;

FIG. 8b illustrates an inflated (blown) coated bottle obtained from the pre-blown coated preform of FIG. 8a.

In one embodiment of the invention, the surface energy of at least a part of the inside surface of the plastic container is increased in step d) by applying at least one inner hydrophilic coating layer.

The first layer of polyvinyl acetal provided in step a) serves as base coating for the subsequent added barrier coating of polyvinyl alcohol and the second (top) layer of polyvinyl acetal. The first base coating of polyvinyl acetal has strong adherence to the plastic material of the container and provides support for the polyvinyl alcohol layer provided in step b) and the top coating layer of polyvinyl acetal provided in step c).

Since polyvinyl alcohol adheres very well on polyvinyl acetal and vice versa, the subsequent added layers are likewise mechanical stable and result in a mechanically stable overall coating after the final shaping process of the container.

The barrier coating comprising the layers manufactured in steps a, b and c) can be applied on at least a part of the outside or the inside of the containers. In another embodiment of the invention, the barrier coating may be applied to at least a part of the outside and inside of the plastic container or a preform thereof.

The term "at least a part of the outside or the inside of the container" refers to any part of the container where the gas barrier of the plastic material shall be improved by the method of the invention. In one variant of the invention, the entire outer or inner surface of the container is coated. In another variant, only the parts of the container are coated which have a lower gas barrier as other parts. It is within the invention to coat only the lid of a container which has on other parts a sufficient low gas permeability. For example, containers form multilayer cardboard have a good gas barrier, but are closed with lids having a low gas barrier. To improve the overall gas barrier and the shelf life of the packed good, it is sufficient to provide the lid with a barrier coating of the present invention.

Polyvinyl alcohol reduces the gas permeability (especially $O_2$ and $CO_2$) of the substrate significantly, thereby improving the shelf-life of packed foods, soft drinks or beer. The use of coating consisting only of polyvinyl alcohol (PVA) is limited because of its moisture sensitivity. To overcome this, it has been found that polyvinyl acetals are especial suitable as base and top coating for PVA layer since both polymers have a similar polymeric backbone and are compatible in a broad range of mixtures.

The plastic material may be coated untreated or optionally prior to step a) pre-treated by chemical roughening, oxyfluorination, corona, electron beam or flame treatment.

Pre-treatment can enhance the adherence of the layers to the substrate. However, pre-treatment is an additional process step and the method of the invention provides in most cases mechanical stable coating layers which can be stretch-blown without cracks or delamination without pre-treatment.

Figure 1:
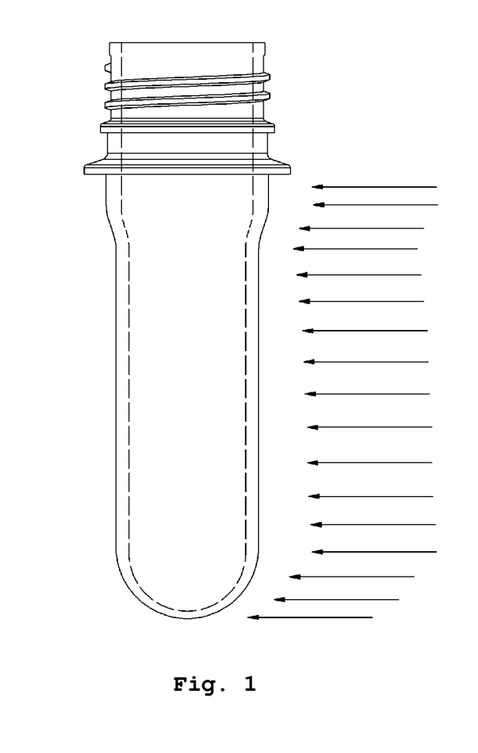
FIG. 1 illustrates corona, electronic beam or plasma treatment of a preform for a bottle.

The plastic material is optionally pre-treated or activated on the inside and/or outside by processes known in the art for such purposes. The process of the invention may include mechanical roughening, corona, electronic beam, plasma treatment or flame treatment or oxyfluorination of at least a part of the surface of the plastic material. FIG. 1 shows a typical preform for a bottle treated with corona, electronic beam or plasma.

Mechanical roughening can be achieved by a sandblast process, wherein the inside and/or outside surface of the container is provided with a roughness Rz of at least 100 μm, preferably 200 μm.

Preferably the pre-treatment or activation of at least a part of the surface of the plastic material results in an increase of the surface energy of the treated part of the plastic material of at least 25%, more preferably of at least 50%, based on the surface energy prior to treatment.

Untreated PET shows a surface energy of 30-45 mJ/m². Accordingly, if the plastic material consists of PET, surface energy after pre-treatment should be at least 50 mJ/m², preferable at least 55 mJ/m² and especially at least 60 mJ/m², the upper range being 150 mJ/m².

Untreated PP has a surface energy of 25-35 mJ/m². Accordingly, if the plastic material consists of PP, surface energy after pre-treatment should be at least 45 mJ/m², preferable at least 50 mJ/m² and especially at least 55 mJ/m², the upper range being 150 mJ/m². The surface energy is measured according the manual of Accu Dyne Test™ Marker Pens.

Oxyfluorination is described in detail for example in WO2004/089624 or U.S. Pat. No. 5,900,321. The pre-treatment by oxyfluorination according to this invention may be conducted by exposing at least a part of the surface of the plastic material to a fluorine-containing gas mixture containing 0.01% to 5% by volume fluorine and optionally inert gases like nitrogen or air, or an additional reactive species such as chlorine or oxygen. Oxyfluorination for this invention may take place at a pressure of 10-10000 kPa, preferably 100-5000 kPa at a temperature of 10-90° C. with a time of exposure of 1 to 60 minutes.

Figure 2:
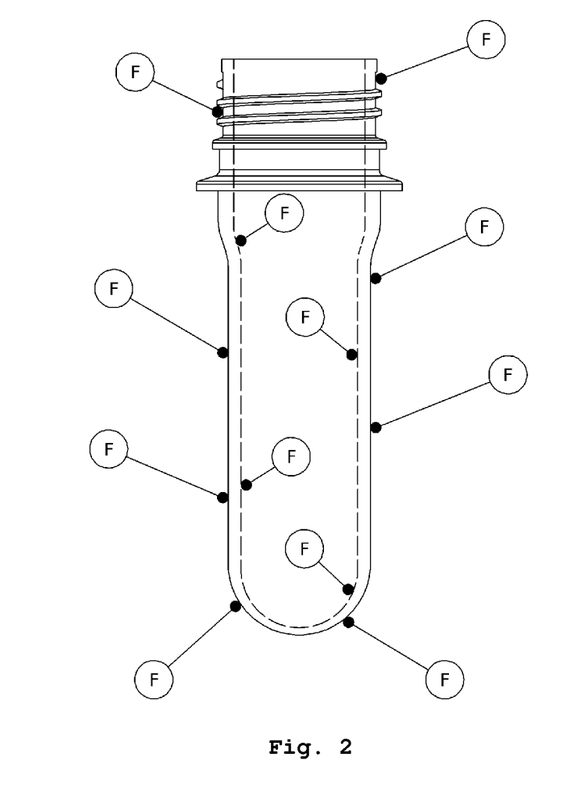
FIG. 2 illustrates a pre-treated preform of a bottle after oxyfluorination.

FIG. 2 shows a pre-treated preform of a bottle, for example after Oxyfluorination. "f" in FIG. 2 stands for the pre-treated/oxyfluorinated sites on the preform. The preform may be pre-treated on the inside (i.e. the side of the container which will be in contact with the packed goods) and/or on the outside. Preferable, the preform is pre-treated only on the outside.

Optionally after cleaning and pre-treatment, the first (base) layer of polyvinyl acetal is applied to the container.

For the first and second coating, polyvinyl acetal as the reaction product of polyvinyl alcohol with one or more aldehydes is used. Suitable polyvinyl acetals are selected from the group consisting of polyvinyl butyral, polyvinyl acetyl-co-butyral and crosslinked polyvinyl butyral. The acetalization degree of the polyvinyl acetals should be between 70 and 90 mol %, the polyvinyl alcohol content between 8 and 30 mol %.

The polyvinyl acetal is applied on the surface of the container and/or the polyvinyl alcohol layer as solution in an organic solvent, for example as solution in methyl ethyl ketone (MEK), methanol, acetone or ethanol for example by dip-coating, flowing or spraying. The concentration of the coating solution is preferable between 5 and 25% by Weight. The base layer from polyvinyl acetal thus applied may have a thickness of 0.01 to 5 μm.

Superfluous coating material may be removed by spinning of the plastic material. The coating is dried at room temperature for 4-8 hours (overnight) or at elevated temperature in an oven with temperatures between 30 and 60° C. for 0.5 to 2 hours. With the aid of appropriate machinery like conveyors with heaters, fast drying/curing is obtained in 15-30 sec.

After the first polyvinyl acetal layer is applied to at least a part of the container, the plastic material is coated with polyvinyl alcohol as barrier coating on the first layer of polyvinyl acetal. Preferably the polyvinyl alcohol has a degree of saponification/hydrolization of at least 90%, preferable of at least 98%. The PVA layer does not contain a plasticizer except some traces of moisture originating from the coating process.

Figure 3:
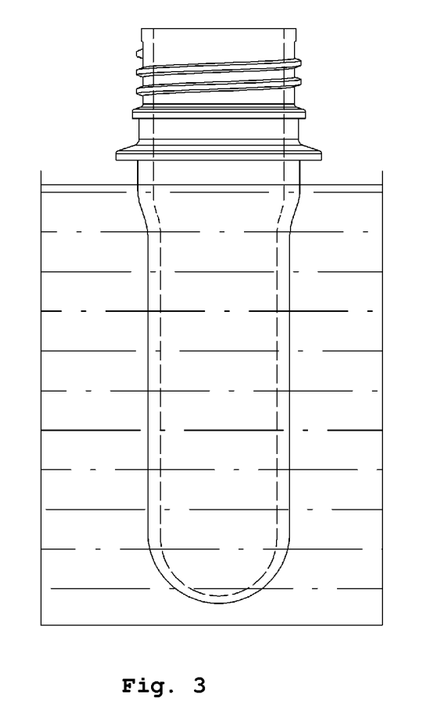
FIG. 3 illustrates the coating of a preform having a base coating by dipping into an aqueous solution of polyvinyl alcohol.

The coating layer from polyvinyl alcohol may have a thickness of 0.01 to 5 μm. Preferable, the polyvinyl alcohol is applied as aqueous solution, for example by dip-coating, flowing or spraying. The concentration of the coating solution is preferable between 5 and 25% by weight. FIG. 3 shows the coating of a preform having a base coating by dipping into an aqueous solution of polyvinyl alcohol.

Again, superfluous coating material may be removed by spinning of the plastic material. The barrier-coated plastic material is dried to remove essential all water at ambient temperature of to 90° C., preferable 10-50° C. optionally at reduced pressure and then subjected to the protective top-coating with the second polyvinyl acetal.

First and second polyvinyl acetals may be different or identical polymers. The process of coating and drying of the first and second layer of polyvinyl acetal may be different or identical. In order to reduce the complexity of the process it is preferred to utilize identical polyvinyl acetals and methods for both steps a) and c).

Figure 4:
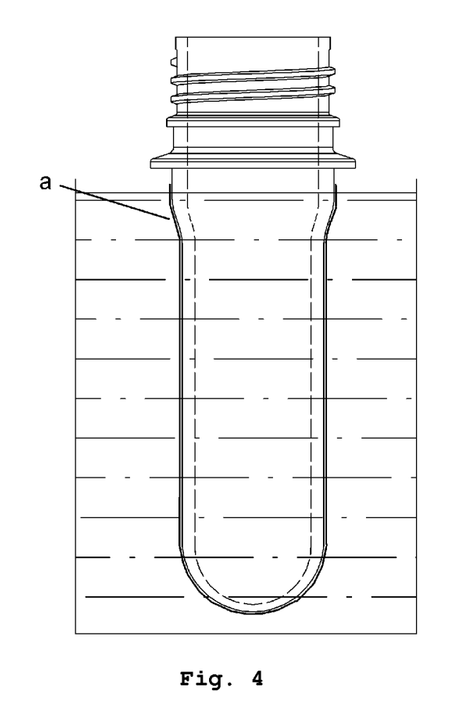
FIG. 4 illustrates the coating of a preform with a base coating of polyvinyl acetal a) and a barrier coating of polyvinyl alcohol b) by dipping into a solution of polyvinyl acetal (step c)

FIG. 4 shows the coating of a preform with a base coating of polyvinyl acetal a) and a barrier coating of polyvinyl alcohol b) by dipping into a solution of polyvinyl acetal (step c).

The barrier coating of steps a, b) and c) can be applied on at least a part of the outside or the inside of the plastic container. It is furthermore possible to apply the barrier coating of steps a, b) and c) on at least a part of the inside and at least a part of the outside of the plastic container.

In a further embodiment of the invention, after steps a, b and c), the inner hydrophilic layer according to step d) is applied on at least a part of the inner surface of the container thereby increasing the surface energy of the inside of the container. The layer can be applied on a pre-treated or an untreated surface. Suitable coating materials are for example vegetable fats or oils, glycerin esters, polyvinyl alcohol, polyvinyl acetal, but any substance which increases the surface energy of the inner surface of the container by the values mentioned for the pre-treatment can be used.

Figure 5:
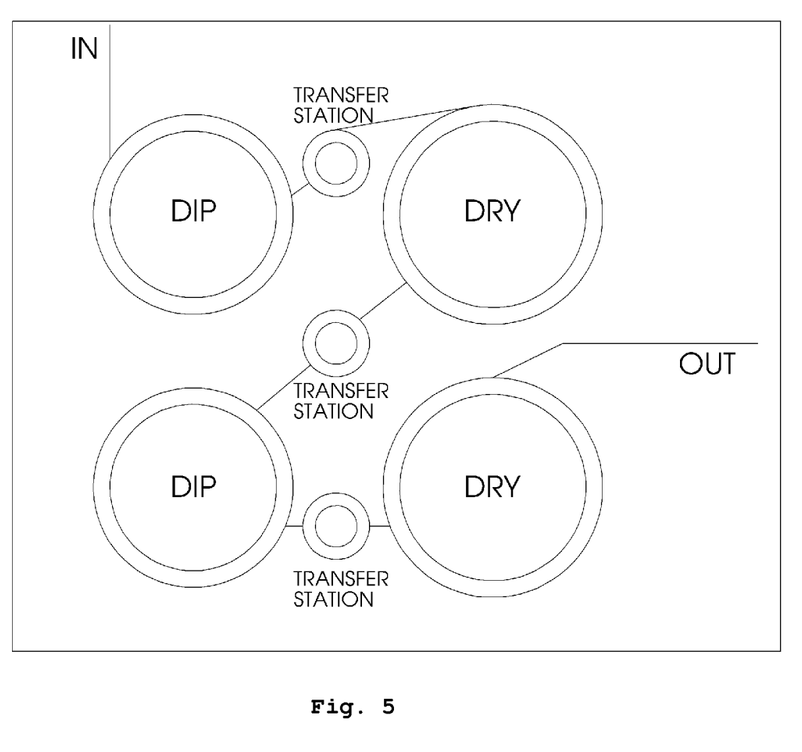
FIG. 5 illustrates a flow sequence for a preform coating line.
Figure 6A:
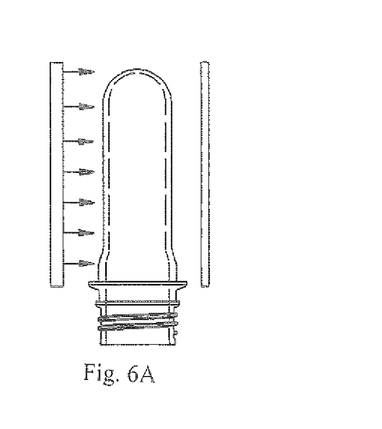
Figure 6B:
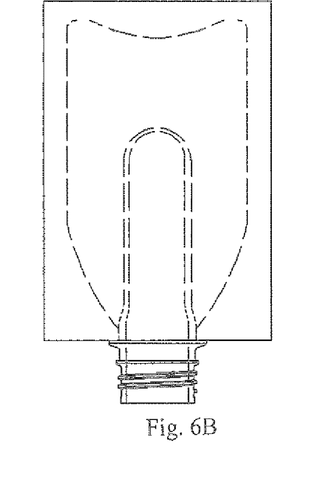
Figure 6C:
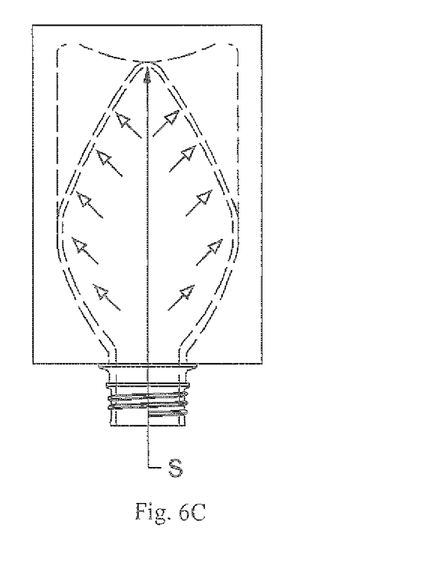
Figure 6D:
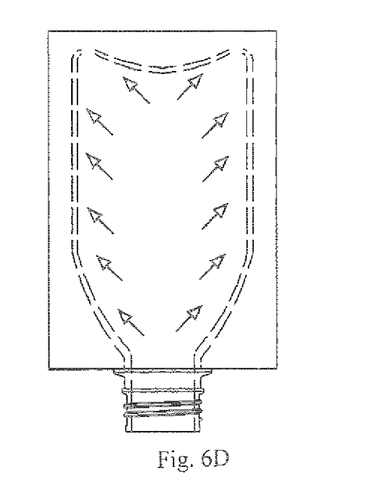

FIG. 5 shows a flow sequence for a preform coating line, where the coating steps a), b) are conducted by dipping the optionally pre-treated preform into solutions of polyvinyl alcohol and polyvinyl acetal with subsequent drying stations. Step c) is performed in the coating and drying station of step a). The preforms are transferred between the coating and drying station via transfer stations with appropriate machinery.

It is possible to incorporate dyes or pigments in the barrier coating, the base and/or the protective top coating. Suitable pigments are for example $SiO_2$, $Al_2O_2$, or $TiO_2$, as dyes "Rhenol"-type dyes from Clariant can be used. The concentration of dyes or pigments in each layer can range from 0.01 to 5 Wght %, based on the polymer.

Subsequent to coating and drying according to the steps a, b, c, the plastic material may be final shaped into a container by a blow-forming process a blowing process like stretch blowing or injection stretch blow molding. The optional step d) may be performed prior or after the blowing process.

The plastic material to be coated with the process of the invention may comprise or consist of polymers selected from the group PET, PP, PE (polyethylene) and COC (cyclic olefin copolymer.

The plastic material may have any two or three dimensional shape like film or a container or a part of a container. The coating may also be applied on a first shaped body (preform) which is then formed into the container. "Preform" as used in this application is not limited to any shaped body, especially not to preforms of a bottle and may characterize any first shaped body which is used to produce the final container by another shaping process. FIG. 1 shows a typical preform for a bottle.

Yet another object of the invention is a process to manufacture a container by subjecting a optionally pre-treated preform of the container, to a process comprising the already described coating steps a, b, c and optionally d) and subsequently shaping the preform into the final shape of the container. Preferable, shaping the preform is performed by a blowing process like stretch blowing or injection stretch blow molding.

Figure 7A:
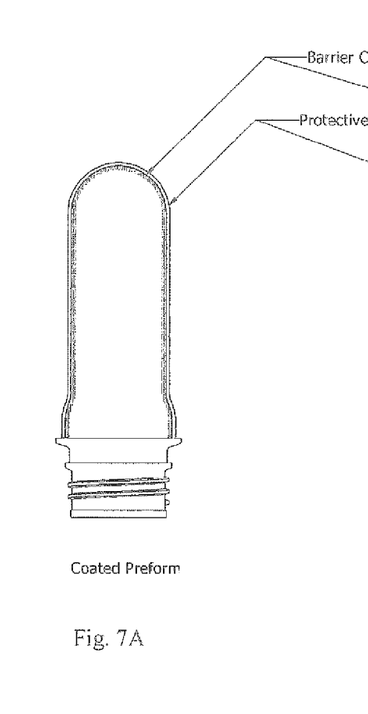
FIG. 7a illustrates a coated preform according to the invention.
Figure 7B:
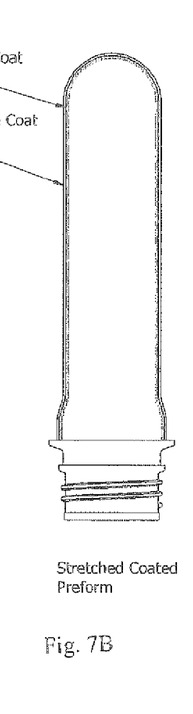
Figure 8A:
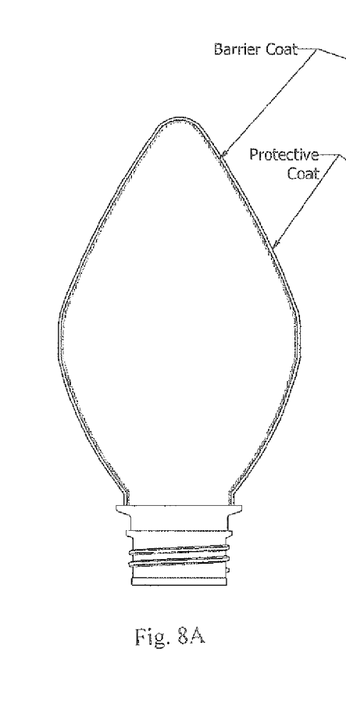
FIG. 8a illustrates pre-blown coated preform obtained from the stretched preform of FIG. 7b.
Figure 8B:
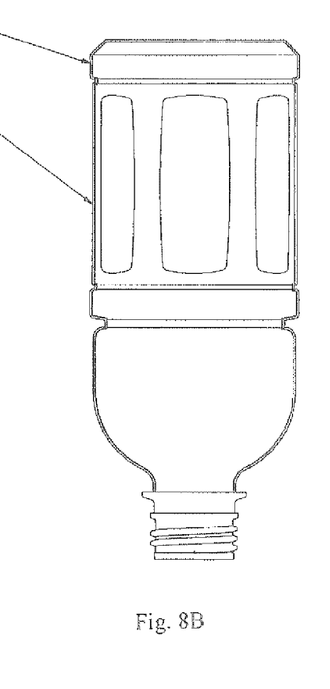

A stretch blow process for the invention is shown by way of example in FIG. 6. In step a, the preform is first heated and then transferred into the mold (b). After stretching by force s and pre-blowing (step c), the bottle is finally blown in step d. FIG. 7 shows a coated preform according to the invention (a) which can be stretched without damaging the coating (b). The stretched preform of FIG. 7 can be converted into a stretched pre-blown coated preform as shown in FIG. 8a, which is finally inflated (blown) to a coated bottle (FIG. 8b)

The coating according to the invention may be applied to the outside or the inside or both sides of the container.

The containers coated by the process of the invention may be used for food, or beverages, drugs, spices, coffee, tea or chemicals. The container may have a shape selected from the group consisting of capsules, blister packages, sachets, envelopes, jerry cans, bottles, jars and lids thereof.

Figure 9A:
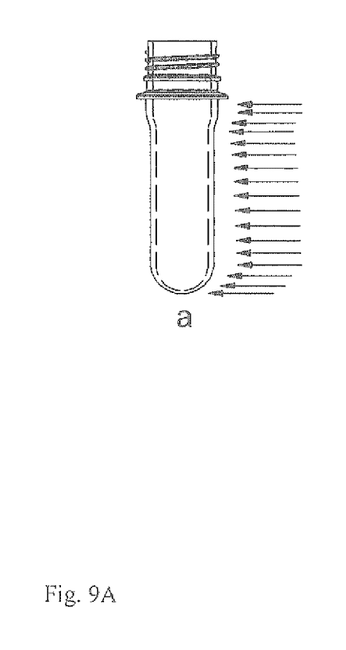
FIGS. 9a and 9b illustrates a comparison of preform and bottle plasma treatment and coating.
Figure 9B:
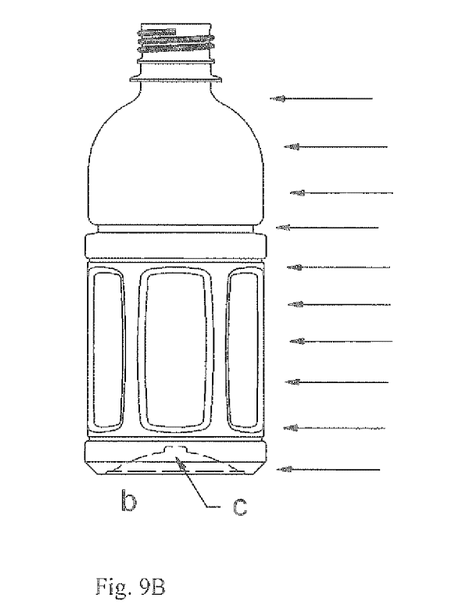

The advantage of the process according to the invention is that the coating is flexible enough to survive a stretch blow process, yet mechanically and chemically stable enough to protect packed goods. FIG. 9 shows a comparison of preform and bottle plasma treatment and coating. Smooth non-obstructed preform shapes allow good access for surface treatment and uniform coating (FIG. 9a). Side bottle grooves, curved-in bottom and side panels are difficult to reach areas for plasma surface treatment, easy to melt and result in coating uneven distribution with accumulation in the grooves and panel corners (FIG. 9b).

EXAMPLES

Coating of Polypropylene Containers

A vessel of pressurized treatment gas was first prepared by pulling a strong vacuum (<1 torr) on a clean, dry steel pressure cylinder that had been passivated for fluorine service. To this was added 20% (by volume) of $F_2$ in nitrogen until a gauge pressure of 1061 kPa (154 psi) was achieved. Then dry, oil-free compressed air was added until the vessel achieved a gauge pressure of 3.4 MPa (500 psi). This cylinder was laid horizontally on a roller device and rolled for 48 hours to mix the gases to homogeneity.

Fluorooxidation was performed batch-wise in a steel vessel with an internal volume of 56 l (2 $ft^3$). Polypropylene containers were placed on a wire rack in the treatment vessel at ambient temperature, and the vessel door was closed and sealed. Using a vacuum pump, air was evacuated from the treatment vessel until a pressure of 5 torr was achieved. The pressurized treatment gas described above was admitted until an absolute pressure of 760 torr was achieved.

The polypropylene containers were left in the reactor with the fluorine gas mixture for 20 minutes. The gases in the reactor were then removed by a vacuum pump that exhausted through a caustic scrubber. The evacuated reactor was filled with dry, oil-free air to 765 torr and then evacuated to 5 torr. This purging step was performed ten times. The reactor was again filled with dry, clean air, the door was opened, and the treated polypropylene containers were removed.

The surface energy of the polypropylene containers before fluorooxidizing was 30-34 $mJ/m^2$, after pre-treatment the surface energy was found to be 52-56 $mJ/m^2$ (dynes/cm). Surface energy was measured with Accu Dyne Test™ Marker Pens.

Coating of Polyethylene Terephthalate (PET) Containers

A vessel of pressurized treatment gas was first prepared by pulling a strong vacuum (<1 torr) on a clean, dry steel pressure cylinder that had been passivated for fluorine service. To this was added 20% (by volume) of $F_2$ in nitrogen until a gauge pressure of 703 kPa (103 psi) was achieved. Then dry, oil-free compressed air was added until the vessel achieved a gauge pressure of 3.4 MPa (500 psi). This cylinder was then laid horizontally on a roller device and rolled for 48 hours to mix the gases to homogeneity. Fluorooxidation was performed batch-wise in a steel vessel with an internal volume of 56 l (2 $ft^3$).

PET containers were placed on a wire rack in the treatment vessel at ambient temperature. The vessel door was closed and sealed. Using a vacuum pump, air is evacuated from the treatment vessel until a pressure of 5 torr is achieved. The pressurized treatment gas described above was admitted into the reaction vessel until an absolute pressure of 765 torr was achieved.

The PET containers were left in the reactor with the fluorine gas mixture for 15 minutes.

The gases in the reactor were removed by a vacuum pump that exhausted through a caustic scrubber. The evacuated reactor was filled with dry, oil-free air to 760 torr and then evacuated to 5 torr. This purging step was performed ten times. The reactor was again filled with dry, clean air, the door was opened, and the treated PET containers were removed.

The surface energy of the PET containers before fluorooxidizing was 36-40 mJ/m$^2$, after pre-treatment the surface energy was found to be 56-60 mJ/m$^2$ (dynes/cm). Surface energy was measured with Accu Dyne Test™ Marker Pens.

Coating

Preforms for 500 ml bottles from PP and PET were used either untreated or pre-treated as described.

Step a): Base Coating

A 10 Wght % ethanolic solution of polyvinyl butyral (PVB) MOWITAL SB 30HH (Kuraray Europe GmbH) with a PVOH content of 18-21 mol % and a polyvinyl acetate content of 1-4 mol % was prepared and coated by dipping the preforms into the solution. Excess coating liquid was removed by spinning and the coated preforms were left to dry overnight at room temperature.

Step b): PVA Coating

A 10 Wght % aqueous solution of MOWIOL 28-99 (PVA with a degree of saponification 99%) from Kuraray Europe GmbH was prepared and coated by dipping the preforms provided with the base coat into the solution. Excess coating liquid was removed by spinning and the coated preforms were left to dry overnight at room temperature.

Step c): Top Coating

Then, a 10 Wght % ethanolic solution of MOWITAL SB 30HH as polyvinyl butyral (PVB) with a PVOH content of 18-21 mol % and a polyvinyl acetate content of 1-4 mol % (Kuraray Europe GmbH) was prepared and coated by dipping the preforms already coated in steps a) and b) into the solution. Excess coating liquid was removed by spinning and the coated preforms were left to dry overnight at room temperature.

The thus coated preforms were blown on a usual Stretch Blow Molding machine used to blow uncoated preforms from the respective substrate materials with substantial the same parameters for the shaping process as for PP or PET.

The following table shows the oxygen permeability results of coated bottles according to the invention as compared to uncoated bottles, as measured with a MoCon test equipment.

| Material | Coated | Uncoated |
|---|---|---|
| PP (360 ml bottle) | 0.0025 cc/pkg/day | 0.1 cc/pkg/day |
| PET (250 ml bottle) | 0.00078 cc/pkg/day | 0.022 cc/pkg/day |

"cc/pkg/day" stands for loss of cubic centimeter gas per day per package As can be seen from the table, the oxygen permeability of coated PP bottles can be reduced to 2.5% and for coated PET bottles to 3.5% of the respective value for uncoated bottles.

The bottles and the coating were mechanical stable against usual wear (for example fingernail scratch) and humidity (for example remove a water-filled bottle from the refrigerator). If the preform was not coated with the base coat a), oxygen permeability results were lower due to pinholes and/or cracks occurring in the coating after blowing. Furthermore, the coating can be removed by fingernail scratching and is then sensitive to moisture.

The following table shows that the method of the invention results in mechanically stable coating even without pre-treatment.

Table 1 shows that preforms coated without first polyvinylacetal base layer have an unsatisfactory mechanical performance. Accordingly, this preforms can not be shaped into the final container by a blowing process without delamination (Table 2).

As can be seen from table 3, preform coatings with a polyvinylacetal base layer i.e. according to the invention have an excellent mechanical behavior. Table 4 shows that preforms coated with the method of the invention can be blown into bottles (i.e. shaped) with only minor delamination of the coating.

The entire disclosure[s] of all applications, patents and publications, cited herein and of corresponding European Application No. 11168859.4, filed Jun. 6, 2011, are incorporated by reference herein.

The preceding examples can be repeated with similar success by substituting the generically or specifically described reactants and/or operating conditions of this invention for those used in the preceding examples.

TABLE 1

| | | Tests | | |
|---|---|---|---|---|
| | Surface treatment and coatings types | Visual inspection | Knife test for adhesion | Tape test for adhesion |
| 1 | 2 | 3 | 4 | 5 |
| No treatment with PVA + PVB coatings | PET preforms PET inflated containers (preform coated) PET injection molded containers with smooth surface PET injection molded containers with rough surface | Fair | Poor | Poor/Fair |
| | PP preforms PP inflated containers (preform coated) PP injection molded containers with smooth surface PP injection molded containers with rough surface | Poor/Fair | Poor | Poor |

TABLE 2

| Not treated with PVA + PVB coatings | Delaminated | No delamination | Total |
|---|---|---|---|
| PET preforms | 98 | 2 | 100 |
| PET inflated containers | 97 | 3 | 100 |
| PET injection molded containers with smooth surface | 97 | 3 | 100 |
| PET injection molded containers with rough surface | 95 | 5 | 100 |
| PP preforms | 97 | 3 | 100 |
| PP inflated containers | 96 | 4 | 100 |
| PP injection molded containers with smooth surface | 96 | 4 | 100 |
| PP injection molded containers with rough surface | 94 | 6 | 100 |

TABLE 3

| Surface treatment and coatings types | | Tests | | |
|---|---|---|---|---|
| | | Visual inspection | Knife test for adhesion | Tape test for adhesion |
| Treatment with PVB + PVA + PVB coatings | PET preforms PET inflated containers (preform coated) PET injection molded containers with smooth surface PET injection molded containers with rough surface PP preforms PP inflated containers (preform coated) PP injection molded containers with smooth surface PP injection molded containers with rough surface | Excellent | Good/ Excellent | Good/ Excellent |

TABLE 4

| Treated with PVB + PVA + PVB coatings | Delaminated | No delamination | Total |
|---|---|---|---|
| PET preforms | 0 | 5000 | 5000 |
| PET inflated containers | 4 | 4996 | 5000 |
| PET injection molded containers with smooth surface | 2 | 4998 | 5000 |
| PET injection molded containers with rough surface | 0 | 5000 | 5000 |
| PP preforms | 2 | 4998 | 5000 |
| PP inflated containers | 8 | 4992 | 5000 |
| PP injection molded containers with smooth surface | 5 | 4995 | 5000 |
| PP injection molded containers with rough surface | 2 | 4998 | 5000 |

The invention claimed is:

1. A process for producing a plastic container with a barrier coating, said process comprising:
    a) applying at least one coating layer of a first polyvinyl acetal on at least a part of the plastic container;
    b) applying at least one coating layer consisting of polyvinyl alcohol on the first polyvinyl acetal layer; and
    c) applying at least one top coating layer of a second polyvinyl acetal on the polyvinyl alcohol layer.

2. The process according to claim 1, wherein, prior to a), the plastic container is subjected to a pre-treatment wherein the plastic container is pre-treated by chemical roughening, oxyfluorination, corona, electron beam or flame treatment.

3. The process according to claim 2, wherein the surface energy of the plastic container is increased by the pre-treatment by at least 10%.

4. The process according to claim 1, wherein the barrier coating is applied on at least a part of the outside of the plastic container.

5. The process according to claim 1, wherein the barrier coating is applied on at least a part of the inside of the plastic container.

6. The process according to claim 1, wherein the barrier coating is applied on at least a part of the inside and at least a part of the outside of the plastic container.

7. The process according to claim 1, further comprising d) increasing the surface energy of at least a part of the inside surface of the plastic container by applying at least one inner hydrophilic coating layer.

8. The process according to claim 7, wherein the inner hydrophilic coating layer comprises vegetable fats or oils, glycerine esters, polyvinyl alcohol and/or polyvinyl acetal.

9. The process according to claim 1, wherein, subsequent to a), b), and c), the plastic container is shaped in a blow-forming process.

10. The process according to claim 1, wherein the coating layer consisting of polyvinyl alcohol is applied as aqueous solution and dried at 10-90° C.

11. The process according to claim 1, wherein each of the first and second polyvinyl acetals are selected from polyvinyl butyral, polyvinyl acetyl-co-butyral and crosslinked polyvinyl butyral.

12. The process according to claim 1, wherein the plastic container is first coated on the outside by a), b) and c), and then shaped in a blow-forming process.

13. The process according to claim 12, further comprising d) increasing the surface energy of at least a part of the inside surface of the plastic container by applying at least one inner hydrophilic coating layer, wherein the plastic container is coated on the inside by d) after shaping in a blow-forming process.

14. The process according to claim 12, further comprising d) increasing the surface energy of at least a part of the inside surface of the plastic container by applying at least one inner hydrophilic coating layer, wherein the plastic container is coated on the inside by d) prior to shaping in a blow-forming process.

15. The process according to claim 12, wherein the shaping of a preform is performed by a stretch blowing.

16. The process according to claim 7, wherein, subsequent to a), b), c) and d), the plastic container is shaped in a blow-forming process.

17. The process according to claim 12, wherein the shaping of a preform is performed by injection stretch blow molding.

18. The process according to claim 2, wherein the surface energy of the plastic container is increased by the pre-treatment by at least 25%.

19. The process according to claim 11, wherein the acetalization degree of the polyvinyl acetals is between 70 and 90 mol %.

20. The process according to claim 1, the polyvinyl alcohol has a degree of saponification/hydrolization of at least 90%, and the coating layer of polyvinyl alcohol has a thickness of 0.01 to 5 µm.

* * * * *